May 10, 1932.　　　S. WHEELER, JR　　　1,857,829
SHOWER PIPE
Filed Feb. 19, 1930
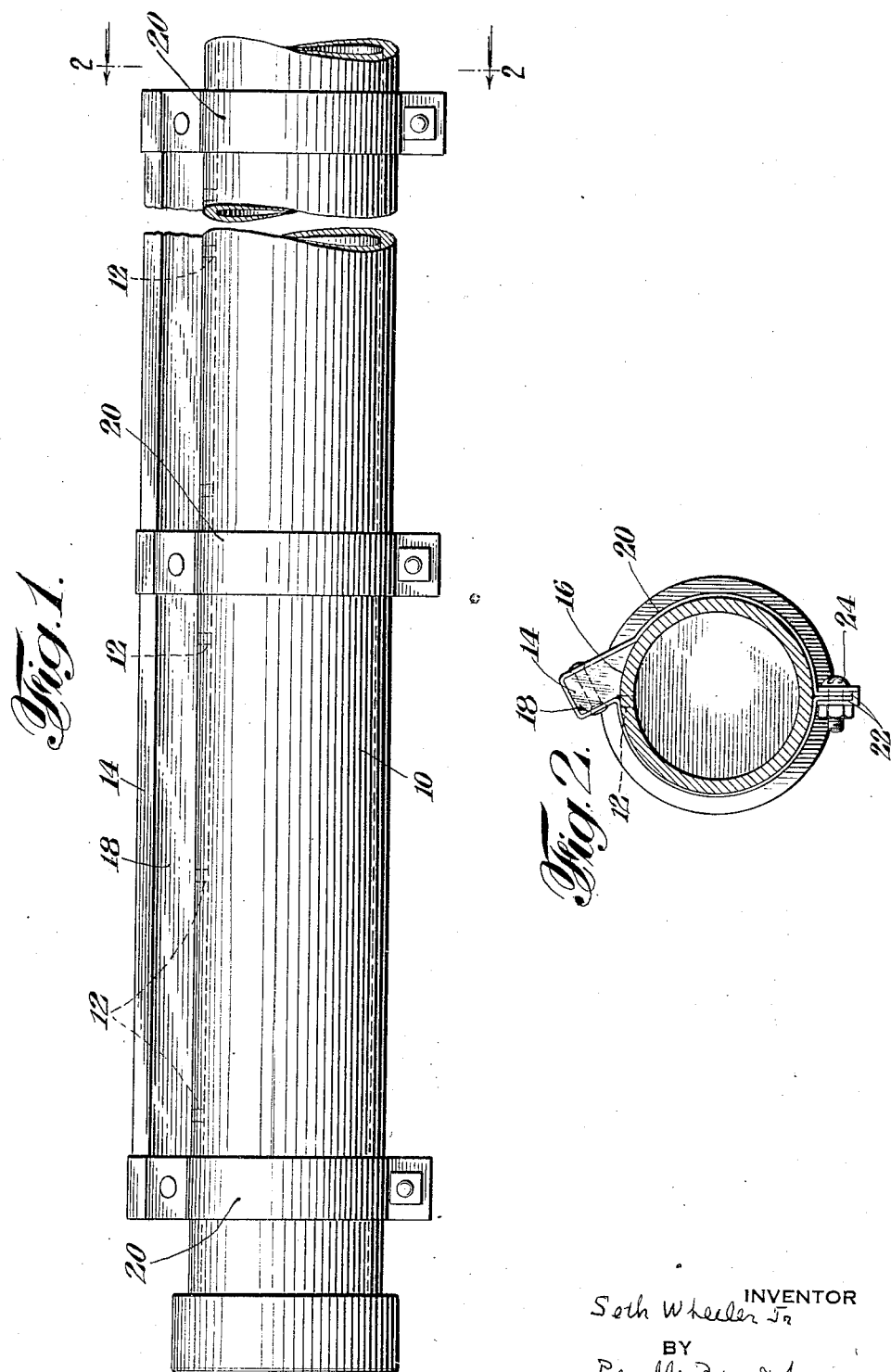
INVENTOR
Seth Wheeler Jr
BY
Prindle, Bean Johnann
ATTORNEYS Patented May 10, 1932

1,857,829

UNITED STATES PATENT OFFICE

SETH WHEELER, JR., OF ALBANY, NEW YORK

SHOWER PIPE

Application filed February 19, 1930. Serial No. 429,561.

This invention relates to shower pipes such as are used at various points in paper-making machinery, as for example to spray the Fourdrinier wire, the cylinder wire, the wet felt, or at other points where a spray may be used. These shower pipes are ordinarily made of a length to suit the paper machine and have holes of approximately ⅛-inch in diameter spaced 2 or 3 inches apart along their length. It is also customary to form a lip on the pipe so that the water coming out of the holes will strike this lip and be formed into a flat spray.

One of the difficulties with pipes of this character is that soft, pliable material is used so that the lip may be shaped out of the pipe material, with the result that the edges of the holes and the lip will easily become worn by the attrition of the water and any sand or solid matter that it may contain. According to the present invention, I utilize a separable, adjustable lip which may be attached at any desired angular position about the periphery of the pipe. By thus making the lip out of a separate piece, the pipe may be formed of any desired hard or non-corrosive material and the lip can likewise be formed of hard material. Thus, for example, I may use a hard brass such as the alloy sold under the trade name of "Everdur", or I may use a non-corrosive chromium alloy steel, or other hard metal preferably resistant to corrosion.

My invention can readily be understood by reference to the illustrative example shown in the accompanying drawings, in which Fig. 1 is a side view of a pipe embodying my invention, and Fig. 2 is a section on line 2—2 of Fig. 1.

As here shown, the shower pipe is an ordinary cylindrical pipe 10 in which are formed spaced perforations 12. A bar 14, preferably made of a wear and corrosion resistant metal, is shaped so that one face 16 will fit against the periphery of the pipe when the member 14 is positioned parallel with the axis of the pipe. When the member 14 is thus positioned on the pipe, the short face 18 forms an acute angle with a radius drawn through the intersection of face 16 with face 18. The other two faces of member 14 serve no function and may be made of any desired shape as for example they may be made parallel and perpendicular to face 18. A series of straps 20 are shaped to go around the pipe 10 and member 14 as clearly shown in Fig. 2. The straps 20, which preferably are riveted to member 14, are provided with tab ends 22 connected together by a nut and bolt 24 so that the straps 20 may be tightened around pipe 10. Ordinarily a sufficient number of straps 20 should be used so that one is provided for every three or four holes 12 in the pipe, as it is desirable that the bar 14 be held firmly in position. The parts are assembled so that the intersection of faces 16 and 18 of bar 14 lies just along the edge of the holes 12 as shown in Fig. 2.

With this arrangement, not only is it possible to use far more durable material than is the case where the lip is formed integral with the pipe, but it is also possible to remove the bar and smooth off the face 18 after it has been subjected to substantial wear; and after the holes 12 have worn too large, they can be soldered up and an entirely new set of holes drilled through the pipe at a different angular position, and then the bar 14 can be remounted on the pipe in correct position relative to the new holes. These factors lead to a great economy in the use of shower pipes of this type.

What I claim is:

1. A shower for paper machinery or the like, comprising a pipe, a row of holes in the pipe lying in a single radial plane, and a readily removable member positioned upon the pipe along the line of the edges of such holes and having an approximately flat surface which intersects at an acute angle the projections of such holes and removable and readily adjustable straps passing around said member and said pipe adapted to position and to allow adjustment of said member substantially parallel to the axis of said pipe and in any desired circumferential position upon said pipe.

2. In combination, a pipe, an elongated member adapted to be attached to the pipe in any desired angular position about the periphery of the pipe but substantially paralled with the axis thereof, and having a face which when said member is so attached, will intersect at an acute angle a radial plane passed through the periphery of such pipe adjacent to but outside of that face of such member which is in contact with the pipe, and metal straps passing around said membei and said pipe adapted to so attach said member to said pipe.

3. In combination with a pipe adapted to be drilled with holes along any selected line on the circumference to form a shower, an adjustable elongated member provided with a concave surface shaped to fit over a portion of the circumference of said pipe when the member is substantially parallel to the axis of said pipe and provided with a substantially uniform surface portion along its length adapted to run from the pipe outwardly at an acute angle to the tangent of the pipe at its point of contact when the member is fitted on said pipe, and clamp means adapted when tightened to clamp said member upon said pipe in any desired circumferential position when the member and axis of the pipe are substantially parallel and when loosened to allow the member to be rotated around the pipe to a new position or to be entirely removed from said pipe.

4. A combination as defined in claim 3 in wihch said pipe is provided with a series of holes approximately in the same longitudinal radial plane and in which the adjustable member is positioned adjacent said plane so that its uniform surface portion directs the flow of all water forced out of said holes in approximately the same direction.

SETH WHEELER, Jr.